US010401631B2

(12) United States Patent
Ukai et al.

(10) Patent No.: US 10,401,631 B2
(45) Date of Patent: Sep. 3, 2019

(54) IMAGE DISPLAY DEVICE

(71) Applicant: Hitachi-LG Data Storage, Inc., Tokyo (JP)

(72) Inventors: Ryuji Ukai, Tokyo (JP); Michio Hatagi, Tokyo (JP); Kunikazu Oonishi, Tokyo (JP); Satoshi Ouchi, Tokyo (JP); Yoshiho Seo, Tokyo (JP); Yuya Ogi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 110 days.

(21) Appl. No.: 15/544,533

(22) PCT Filed: Dec. 28, 2015

(86) PCT No.: PCT/JP2015/086505
§ 371 (c)(1),
(2) Date: Jul. 19, 2017

(87) PCT Pub. No.: WO2016/117278
PCT Pub. Date: Jul. 28, 2016

(65) Prior Publication Data
US 2017/0351099 A1  Dec. 7, 2017

(30) Foreign Application Priority Data
Jan. 21, 2015  (JP) .................................. 2015-009836

(51) Int. Cl.
*G02F 1/1335* (2006.01)
*G02B 27/48* (2006.01)
(Continued)

(52) U.S. Cl.
CPC .......... *G02B 27/0179* (2013.01); *B60K 35/00* (2013.01); *G02B 27/01* (2013.01);
(Continued)

(58) Field of Classification Search
CPC .............................. G02F 1/1335; G02B 27/48
See application file for complete search history.

(56) References Cited

U.S. PATENT DOCUMENTS 9,146,450 B2    9/2015  Otani
2011/0285967 A1  11/2011  Gollier
(Continued)

FOREIGN PATENT DOCUMENTS

| JP | 2009-251350 A | 10/2009 |
| JP | 2010-276742 A | 12/2010 |
| JP | 2012-159823 A | 8/2012 |

OTHER PUBLICATIONS

International Search Report of PCT/JP2015/086505 dated Mar. 15, 2016.
(Continued)

*Primary Examiner* — Matthew Salvucci
(74) *Attorney, Agent, or Firm* — Mattingly & Malur, PC

(57) ABSTRACT

An image display device 1 includes a laser light source unit 10, a screen 12 formed of at least two diffusion members, a vibration mechanism 13 vibrating at least one diffusion member, and a scanning element 11 scanning laser light in a first direction (a y direction) on the screen and a second direction (an x direction) orthogonal to the first direction. A scanning speed of the scanning element 11 in the second direction is faster than a scanning speed in the first direction, and a diameter D of the laser light in the first direction on the screen is greater than an interval Yp in the first direction on the scanning trajectory in the second direction on the screen. Accordingly, it is possible to provide an image display device displaying an image having a low speckle with high luminance, without vibrating the diffusion member at a high speed.

20 Claims, 10 Drawing Sheets

(51) Int. Cl.
  *G02B 27/01*  (2006.01)
  *B60K 35/00*  (2006.01)
  *G03B 21/14*  (2006.01)

(52) U.S. Cl.
  CPC ........... *G02B 27/48* (2013.01); *G02F 1/1335* (2013.01); *G03B 21/14* (2013.01); *G02B 2027/0183* (2013.01); *G03B 21/145* (2013.01)

(56) References Cited

U.S. PATENT DOCUMENTS

| | | | | |
|---|---|---|---|---|
| 2012/0013812 A1* | 1/2012 | Gollier | ................. | G02B 26/101 348/744 |
| 2012/0182487 A1* | 7/2012 | Konno | ................. | G02B 27/286 349/7 |
| 2013/0300637 A1* | 11/2013 | Smits | ..................... | G03B 35/18 345/8 |

OTHER PUBLICATIONS

Extended European Search Report received in corresponding European Application No. 15878966.9 dated Aug. 29, 2018.

\* cited by examiner

LIGHT INTENSITY DISTRIBUTION OF GAUSSIAN TYPE LASER LIGHT SOURCE

IRRADIATION PULSE OF LASER LIGHT RECEIVED IN PIXEL IN SCREEN

F I G. 1 1
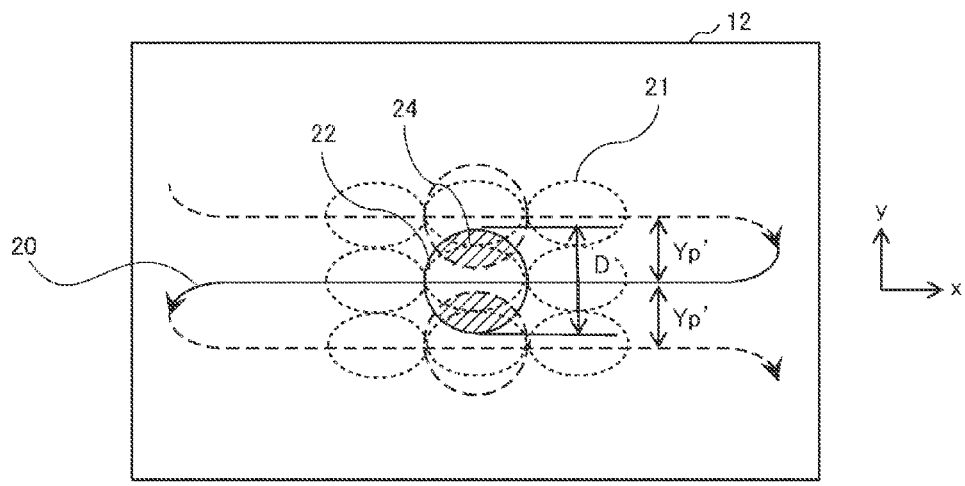
F I G. 1 2
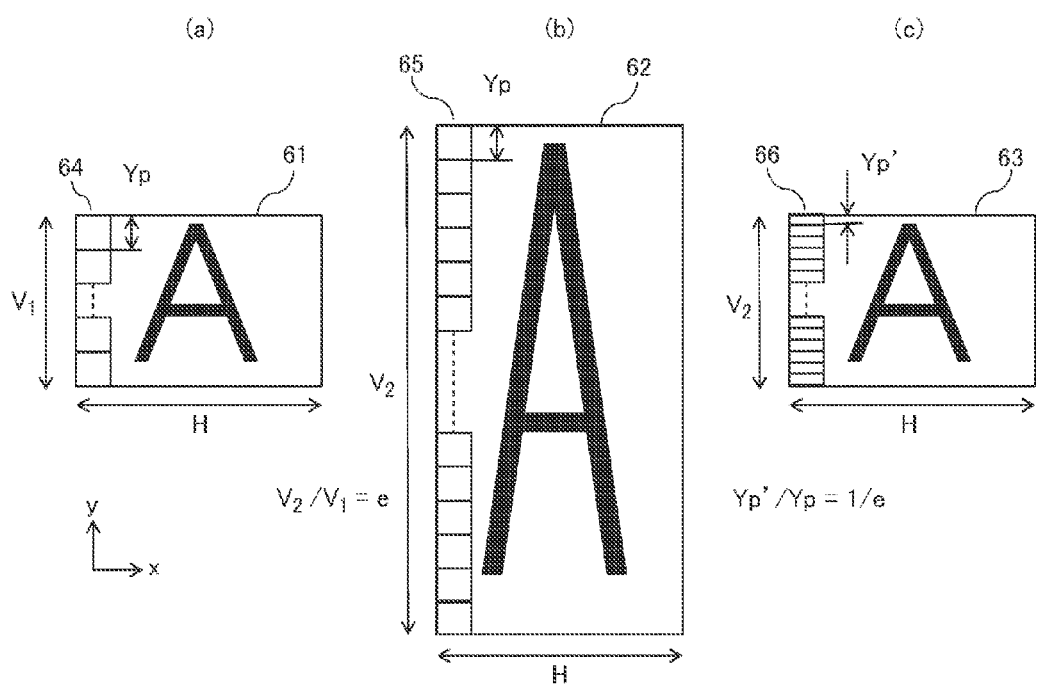

APPLICATION EXAMPLE WITH RESPECT TO ON-VEHICLE HEAD-UP DISPLAY

APPLICATION EXAMPLE WITH RESPECT TO PROJECTION TYPE IMAGE DISPLAY DEVICE

IMAGE DISPLAY DEVICE

TECHNICAL FIELD

The present invention relates to an image display device displaying an image by scanning laser light.

BACKGROUND ART

From the related art, a laser scanning type image display device displaying an image by scanning laser light on a screen is known. In a laser scanning type method, color reproducibility is high, and black floating does not occurs, compared to a method in which image light formed on an image display element such as a liquid crystal panel is projected by using a light emitting diode as a light source. However, there is a problem in that the laser light has coherence, and thus, a random interference pattern referred to as a speckle is generated.

For example, in Patent Document 1, as a technology of preventing the speckle from being generated, a technology is disclosed in which a screen is configured of at least two diffusion members, and at least one diffusion member is oscillated, and thus, an image is viewed without being affected by speckle noise. In addition, it is known that it is possible to reduce the speckle noise by increasing a diffusion angle of the diffusion member used as the screen, compared to a case where the diffusion angle is small (for example, refer to Patent Document 2).

CITATION LIST

Patent Document

Patent Document 1: JP 2010-276742 A
Patent Document 2: JP 2012-159823 A

SUMMARY OF THE INVENTION

Problems to be Solved by the Invention

In a method of oscillating (vibrating) a diffusion member, which is disclosed in Patent Document 1, a speckle pattern viewed by a user is changed according to the vibration of the diffusion member. The change in the speckle pattern is set to be faster than time resolution of the eyes of the user, and thus, the speckle pattern is averaged, and the speckle viewed by the user can be reduced. However, in order to realize such an effect, it is necessary to vibrate diffusion member at a speed faster than a display speed of an image (a scanning speed of the laser light). As described below, specifically, it is necessary to vibrate the diffusion member at a high speed of approximately several km/sec, and thus, the method has practical difficulty.

In a method of increasing a diffusion angle, which is disclosed in Patent Document 2 or the like, a speckle pattern to be generated is multiplexed, and thus, a speckle of an image is reduced. However, there is a problem in that the luminance of the image to be displayed decreases according to an increase in the diffusion angle.

In consideration of the circumstances described above, an object of the present invention is to provide an image display device displaying an image having a low speckle with high luminance, without vibrating a diffusion member at a high speed.

Solutions to Problems

An image display device according to the present invention, the device includes: a laser light source unit allowing laser light to exit; a screen formed of at least two diffusion members which diffuse and transmit the laser light and generate image light; a vibration mechanism vibrating at least one diffusion member in the diffusion members; and a scanning element scanning the laser light exiting from the laser light source in a first direction on the screen and a second direction orthogonal to the first direction, a scanning speed of the scanning element in the second direction is faster than a scanning speed in the first direction, and a diameter of the laser light in the first direction on the screen is greater than an interval in the first direction on a scanning trajectory in the second direction on the screen.

Effects of the Invention

According to the present invention, is possible to provide an image display device displaying an image having a low speckle with high luminance, without vibrating a diffusion member at a high speed.

BRIEF DESCRIPTION OF THE DRAWINGS

FIG. 11 is a diagram illustrating a trajectory of laser light to be scanned on a screen in Example 3.
FIG. 12 is a diagram schematically illustrating scanning line conversion processing.

MODE FOR CARRYING OUT THE INVENTION

Hereinafter, embodiments of the present invention will be described in detail with reference to the drawings.

Example 1

Figure 1:
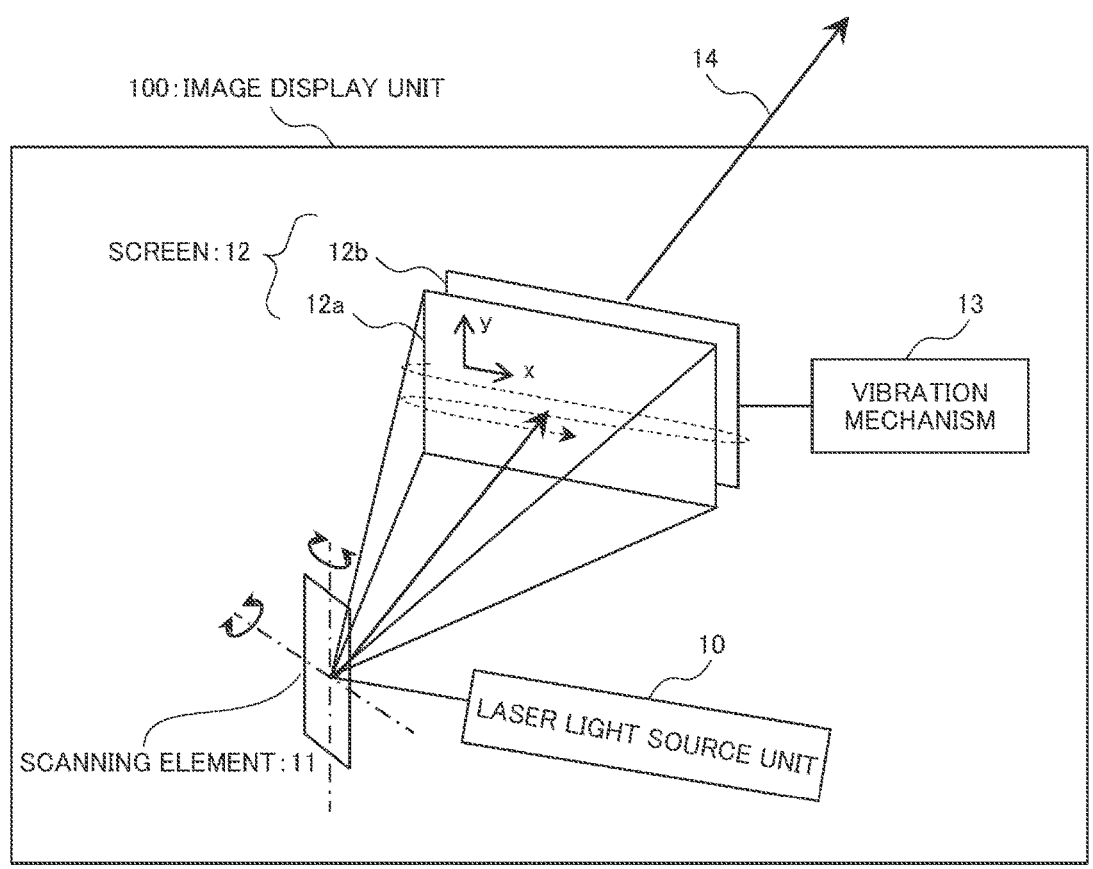
FIG. 1 is a diagram illustrating a configuration example of an image display unit of an image display device according to the present invention.

FIG. 1 is a diagram illustrating a configuration example of an image display unit of an image display device according to the present invention. An image display unit 100 includes a laser light source unit 10 allowing laser light to exit, a scanning element 11 scanning the exiting laser light, a screen generating an image by being irradiated with the laser light, and a vibration mechanism 13 vibrating the screen 12. The laser light source unit 10 allows laser visible light, which is modulated by an image signal to be displayed, to exit. The scanning element 11 biaxially rotates a mirror surface which reflects the laser light, and two-dimensionally (in an x direction and a y direction) scans the laser light on the screen 12. The screen 12 is configured of a plurality of diffusion members (in an example of FIG. 1, two diffusion members 12a and 12b), diffuses the laser light, and sets the laser light as image light. The vibration mechanism 13 vibrates at least one of the diffusion members 12a and 12b in the plane of xy. The light transmitted through the screen 12 is output as image light 14. The image display device according to the present invention is capable of providing an image to a user by the image light 14.

Next, the configuration and the operation of each unit will be described.

Figure 2:
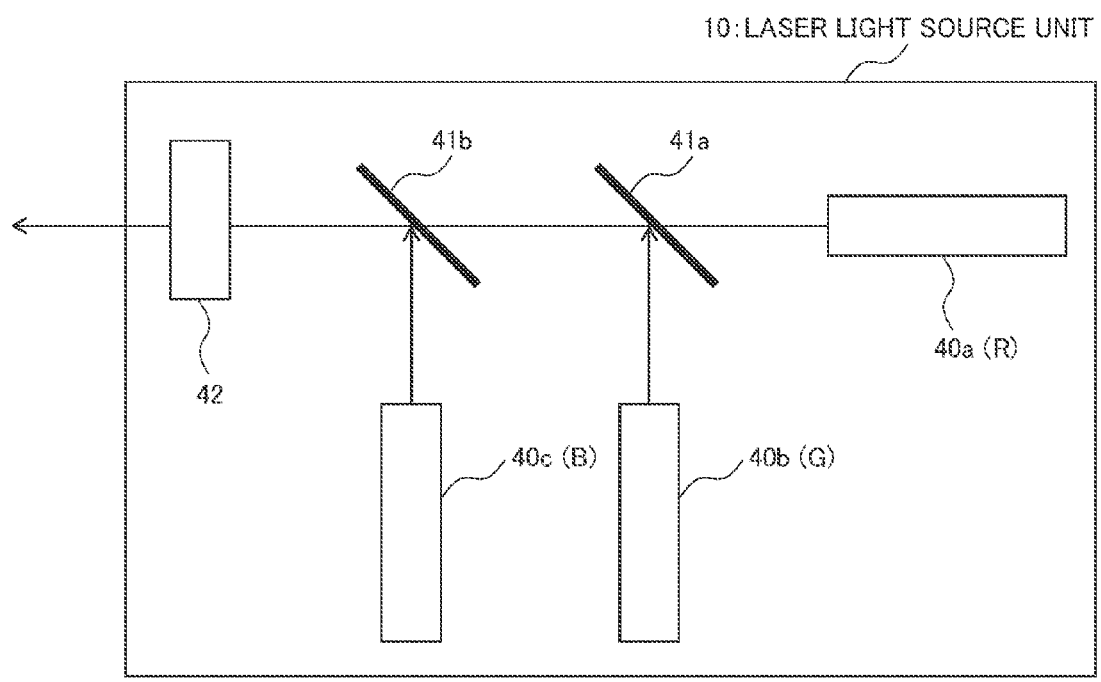
FIG. 2 is a diagram illustrating a configuration example of a laser light source unit 10.

FIG. 2 is a diagram illustrating a configuration example of the laser light source unit 10. The laser light source unit 10 includes laser light sources 40a, 40b, and 40c, dichroic mirrors 41a and 41b, and a beam forming machine 42. The laser light sources 40a to 40c allow laser light having colors different from each other, for example, red (R), green (G), and blue (B), to exit. By using the laser light of red, green, and blue, which are three primary colors of light, it is possible to perform full-color image display. Furthermore, any light source may allow light of any color to exit. The laser light source unit 10 modulates the intensity of each laser light ray exiting from the laser light sources 40a to 40c according to the image signal in each pixel position generated on the screen 12.

The dichroic mirror 41a transmits the red light from the laser light source 40a, and reflects the green light from the laser light source 40b, and thus, synthesizes both of the laser light rays. The dichroic mirror 41b transmits the red light and the green light from the laser light sources 40a and 40b, and reflects the blue light from the laser light source 40c, and thus, synthesizes both of the laser light rays. Accordingly, color laser light in which three-color light is synthesized exits according to the image signal.

The beam forming machine 42 is an optical element forming the beam of the exiting laser light in a predetermined shape. For example, a lens, a prism, an aperture stop, a beam expander, and the like are used in order to adjust a beam diameter to a predetermined size.

Each of the laser light sources 40a to 40c, the dichroic mirrors 41a and 41b, and the beam forming machine 42 are arranged such that the three-color laser light progresses in the same direction with the same optical axis.

In the configuration described above, it is possible to perform full-color display by using three-color (red, green, and blue) laser light, but the present invention is not limited thereto. One-color and two-color laser light may be displayed.

In the configuration described above, the beam forming machine 42 is used in order to form the beam in a predetermined shape, and in a case where each of the laser light sources 40a to 40c allows laser light having a predetermined beam shape to exit, the beam forming machine 42 may not be used.

Next, the scanning element 11 includes the mirror surface reflecting the laser light exiting from the laser light source unit 10 onto the screen 12, and rotates the mirror surface in a biaxial direction, and thus, scans the laser light on the screen 12 in a two-dimensional shape.

A rotation mechanism of the mirror surface includes a rotation axis (hereinafter, a first axis) for scanning the laser light on the screen 12 in the y direction (a vertical direction) and a rotation axis (hereinafter, a second axis) for scanning the laser light on the screen 12 in the x direction (a horizontal direction). Naturally, the first axis and the second axis are orthogonal to each other. Furthermore, there are a case where a rotation direction of the rotation axis (the first axis or the second axis) is set to only one direction (for example, only a right rotation) and a case where the rotation direction of the rotation axis is set to the repetition of both directions (for example, the repetition of a left rotation and a right rotation at less than 360 degrees), according to the scanning pattern on the screen 12.

A frame rate of the image to be displayed is set to f, the number of pixels in the x direction is set to H, and the number of pixels in the y direction is set to V. The scanning element 11 rotates the first axis (for scanning the laser light in the y direction), and scans the laser light in the y direction one time during one frame period (1/f). In addition, the scanning element 11 rotates the second axis (for scanning the laser light in the x direction), and scans the laser light in the x direction V times during one frame period. Scanning start timings in the y direction and the x direction are synchronized with the frame of the image signal which modulates the laser light source 10. Accordingly, the scanning of one frame formed of x direction-H pixel and y direction-V pixel is completed, and is repeated.

The screen 12 is configured of two diffusion members 12a and 12b. For example, a transmissive diffusion sheet or a transmissive diffusion plate having a diffusion angle of approximately 30 degrees is used as the diffusion member. Accordingly, it is possible to prevent moire, which is a regular interference pattern, from being generated. Alternatively, a micro lens array is used as one diffusion member. In a case of the micro lens array, it is possible to control an orientation distribution of the light which is transmitted through the diffusion member, and thus, it is possible to increase the intensity of light which reaches the eyes of the user, and to reduce light which does not reach the eyes of the user, and therefore, it is possible to improve the luminance of the image.

In addition, the diffusion members 12a and 12b are arranged such that a distance (an interval) between diffusion surfaces of the diffusion members 12a and 12b on the screen 12 is less than or equal to 3 mm. This is because an excessive degradation of the resolution of the image, which is caused by using two diffusion members, is prevented. An optimal value in a range of less than or equal to 3 mm is determined under the tradeoff between a reduction in the speckle and the resolution of the image. This is because there is a function in which the distance between the diffusion surfaces increases, and the image is graded, and thus, the speckle is reduced. That is, the distance is set to a value close to 3 mm in a case of having priority at the reduction in the speckle reduce, and is set to a value close to 0 mm in a case of having priority at the resolution.

Figure 3:
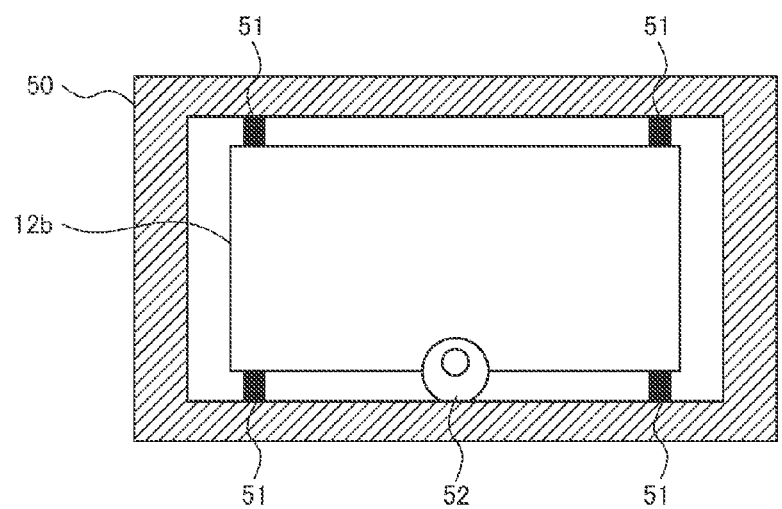
FIG. 3 is a diagram illustrating a configuration example of a vibration mechanism 13.

FIG. 3 is a diagram illustrating a configuration example of the vibration mechanism 13. Here, a case will be described in which one diffusion member 12b configuring the screen 12 is vibrated by an eccentric motor 52. The diffusion member 12b is fixed to a housing 50 of the image display unit 100 (or the image display device 1) through the elastic body 51. In addition, the eccentric motor 52 is attached onto one side of the diffusion member 12b, and the eccentric motor 52 is fixed to the housing 50. In a state where the eccentric motor 52 is not rotated, the diffusion member 12b stands still in a position where a restorative force of the elastic body 51 is balanced. In a case where the eccentric motor 52 is rotated, the balance of the restorative force is disturbed, and the diffusion member 12b is displaced and vibrated. Accordingly, it is possible to vibrate the diffusion member 12b. Here, a case has been described in which one diffusion member 12b is vibrated, but even in a case where both diffusion members 12a and 12b are vibrated, the same configuration can be realized.

Thus, the vibration mechanism 13 vibrates at least one of the diffusion members 12a and 12b of the screen 12. At this time, a vibration direction is set to a plane parallel to the diffusion surface of the diffusion member. The vibration direction is set to the plane parallel to the diffusion surface, and thus, it is possible to prevent a change in the resolution of the image due to the vibration of the diffusion member. In addition, in a case of a vibration in a single-axis direction, there is a moment where the diffusion member is stopped. Accordingly, a vibration in the biaxial direction (a vibration drawing a circular trajectory or an elliptical trajectory) is set such that a period where the diffusion member is stopped is not generated.

Figure 4:
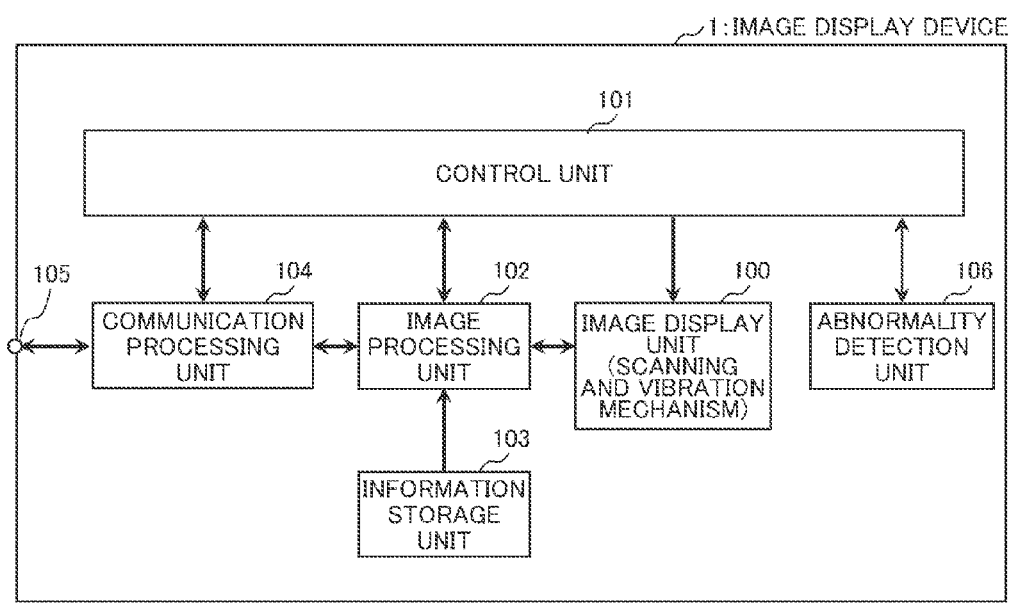
FIG. 4 is a functional block diagram illustrating an overall configuration of an image display device 1.

FIG. 4 is a functional block diagram illustrating the overall configuration of the image display device 1. The image display device 1 includes a control unit 101, an image processing unit 102, an information storage unit 103, a communication processing unit 104, a communication input and output unit 105, and an abnormality detection unit 106, in addition to the image display unit 100 described above.

The image display unit 100 has a configuration illustrated in FIG. 1 described above, and an image stored in the information storage unit 103, an image that the communication processing unit 104 receives from an external device, an image generated by the image processing unit 102, and the like are input into the image display unit 100 from the image processing unit 102 and are displayed. The control unit 101 instructs the acquisition, generation, or the like of the image to be displayed on the basis of the operation of the user, and sets an operation mode of the image display with respect to the image display unit 100.

The abnormality detection unit 106 detects whether or not there is an abnormality in the operation of the image display device 1. In a case where the abnormality is detected, the detection result is transmitted to the control unit 101. The control unit 101 controls the operation of each of the communication processing unit 104, the image processing unit 102, and the image display unit 100 according to the detection result.

Next, the generation of the speckle (speckle noise) of the image display device using the laser light and a speckle reducing method in this example will be described.

In FIG. 1, the light exiting from the laser light source unit 10 is diffused by the screen 12, and reaches the eyes (the retinas) of the user. The number of paths of the light which reaches to the retinas of the user from the laser light source unit 10 through the screen 12 is not determined as only one, but there are a plurality of paths. The lengths of optical paths between the plurality of paths are different from each other, and thus, the light which reaches the retinas of the user through the plurality of paths is interfered, and a case occurs where the light strengthens or weakens. Accordingly, for example, even in a case where the image display unit 100 displays an image of all white, the speckle is generated, and the user views a random spot in the image. The quality of the image is degraded due to the generation of the speckle.

The degree of the generation of the speckle can be quantified by Speckle Contrast=(Standard Deviation of Light Intensity)/(Average Value of Light Intensity). In a case where the speckle is not generated, the speckle contrast becomes 0, and the speckle contrast is set to a greater value as the degree of the generation of the speckle increases. In a case where a perfectly developed speckle is generated, the speckle contrast becomes 1.

A method of vibrating the screen (the diffusion member), which is disclosed in Patent Document 1, is known as a general method of reducing the speckle which is viewed by the user. In a case where the screen is vibrated, the speckle pattern viewed by the user is changed. In a case where the change in the speckle pattern is faster than time resolution of the eyes of the user, the user is not capable of identifying each of the speckle patterns, and views the speckle pattern in a state where a plurality of speckle patterns are integrated. In a case of decreasing a correlation between the respective speckle patterns, the speckle patterns are averaged, and the speckle viewed by the user is reduced.

However, in a general laser scanning type image display device, it is difficult to reduce the speckle by vibrating the screen. This is because it is difficult to make the change in the speckle pattern faster than the time resolution of the eyes of the user. Hereinafter, the reason will be described.

In order to reduce the speckle, two methods for changing the speckle pattern are assumed focused on a pixel position in the screen.

In a first method, it is assumed that during a period from time of drawing a first pixel in the same frame to time of drawing a second pixel adjacent to the first pixel in the x direction, the speckle pattern viewed by the user in the first pixel is changed. For this reason, it is necessary to move (vibrate) the screen in the x direction at a speed higher than a drawing speed (a scanning speed in the x direction) between the adjacent pixels.

For example, the screen is set to one diffusion member, the frame rate f of the image to be displayed on the screen 12 is set to 60 frames/s, the number of pixels H in the x direction (the horizontal direction) is set to 1024, the number of pixels V in the y direction (the vertical direction) is set to 768, and a size P of the one pixel on the screen is set to 0.1 mm square.

Time of drawing one pixel in one frame is set to 1/(f×H×V), and a speed for moving a distance P of one pixel during this time is set P×f×H×V=0.1×60×1024×768 mm/s=5 km/s.

That is, it is necessary to vibrate the diffusion member at a speed of 5 km/s. Furthermore, in a case where there is an invalid period (a blanking period) where an image of the number of pixels (H×V) during the period (1/f) of one frame is now drawn, a necessary speed is faster than or equal to 5 km/s. It is difficult to vibrate the screen (the diffusion member) at such a high speed.

In a second method, in the focused pixel position in the screen, it is assumed that a speckle pattern generated in the first frame is different from a speckle pattern generated in the next second frame. Accordingly, as a result of overlapping the speckle patterns between the frames each other, a reduction in the speckle can be expected. In this case, it is sufficient to move the distance P of one pixel during the period (1/f) of the one frame, and thus, in a case of obtaining the speed in the conditions described above, the speed is faster than or equal to P×f=0.1×60 mm/s=6 mm/s.

That is, the diffusion member may be vibrated at a low speed of faster than or equal to 6 mm/s. However, in such a case, the number of speckle patterns integrated on the eyes of the user per an hour is small (one per one frame), a time-integration effect is low. Accordingly, a speckle contrast is approximately ½ compared to a case where there is no screen vibration, and thus, a speckle reducing effect decreases.

In addition, a method of increasing a diffusion angle of a diffusion member used as a screen, which is disclosed in Patent Document 2 or the like, is known as another general method of reducing the speckle viewed by the user. In a case where the diffusion angle of the screen is large, a speckle pattern to be generated is multiplexed, compared to a case where the diffusion angle of the screen is small, and thus, an image having a low speckle can be generated. However, there is a problem in that luminance decreases according to an increase in the diffusion angle.

Regarding such a problem, in this example, the beam diameter of the laser light applied to the screen is greater than a pixel size (a scanning interval in the y direction), and thus, the same pixel region is irradiated with the laser light a plurality of times (that is, is scanned in the x direction a plurality of times) during one frame period. Then, at least one diffusion member configuring the screen is vibrated, and the speckle pattern is changed during a period where the laser light is scanned in the x direction one time. Accordingly, even in a case where a movement speed of the diffusion member decreases, it is possible to obtain a sufficient speckle reducing effect. Hereinafter, a speckle reducing method of this example will be described.

Figure 5:
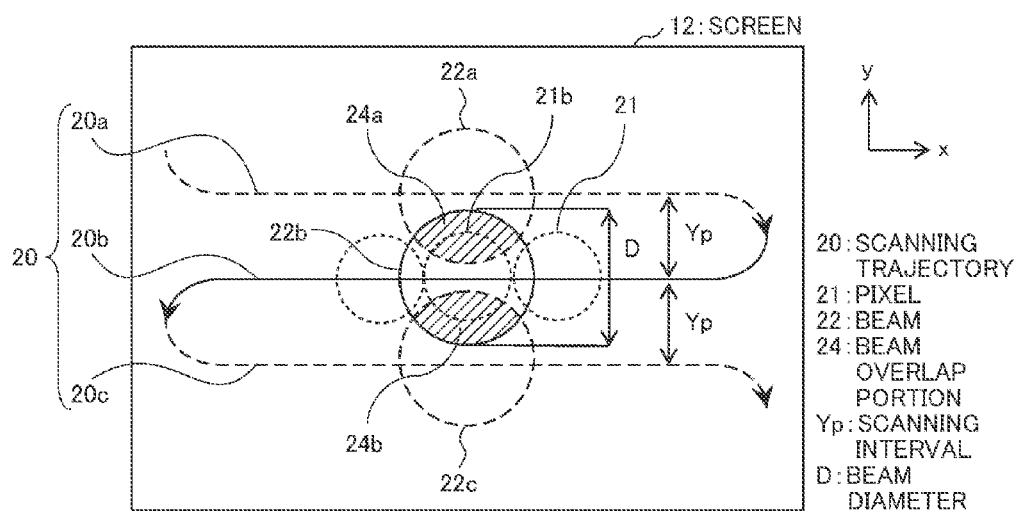
FIG. 5 is a diagram illustrating a trajectory of laser light which is scanned on a screen.

FIG. 5 is a diagram illustrating the trajectory of the laser light scanned on the screen 12 by the scanning element 11. A beam spot on the screen (hereinafter, a beam) is represented as a reference numeral of 22, and the beam spot is in the shape of a circle having a diameter D. A scanning trajectory of the center of the beam 22 according to the scanning of the scanning element 11 is represented by a reference numeral of 20. The scanning trajectory 20 allows a y axis to progress in a negative direction (a lower direction) while horizontally reciprocating an x axis in a positive direction (a right direction) and a negative direction (a left direction). Here, trajectories 20a, 20b, and 20c according to three continuous times of the scanning will be described. Linear portions of each of the trajectories 20a, 20b, and 20c are parallel to each other at regular intervals, and the scanning interval in the y direction is set to Yp. The reference numeral 21 represents a pixel position to be drawn on the screen, and H pixels are drawn in the x direction by one time of the scanning in the x direction.

FIG. 5 illustrates three beams 22a, 22b, and 22c on three trajectories 20a, 20b, and 20c, of which positions are identical to each other in the x direction in the screen 12. In this example, a beam diameter D is configured to be greater than a scanning interval Yp, and preferably is configured to be greater than or equal to 1.3 times the scanning interval Yp. In other words, the beam diameter D is greater than the size of the pixel 21. Accordingly, the beam 22a and the beam 22b include an overlap portion 24a, and the beam 22b and the beam 22c include an overlap portion 24b. In order to obtain such a beam diameter D, for example, the lens or the aperture stop of the beam forming machine 42 in FIG. 2 is adjusted.

FIG. 5 illustrates a region in which the overlap portions 24a and 24b have a distinct boundary, but in actual, the boundary is not necessarily distinct. For example, in a case where laser light sources 10a to 10c allow a Gaussian type light ray to exit, intensity distributions of the laser light rays are Gaussian-functionally attenuated according to a distance from the beam center, and thus, overlap each other on the outside of the beam diameter D.

Figure 6:
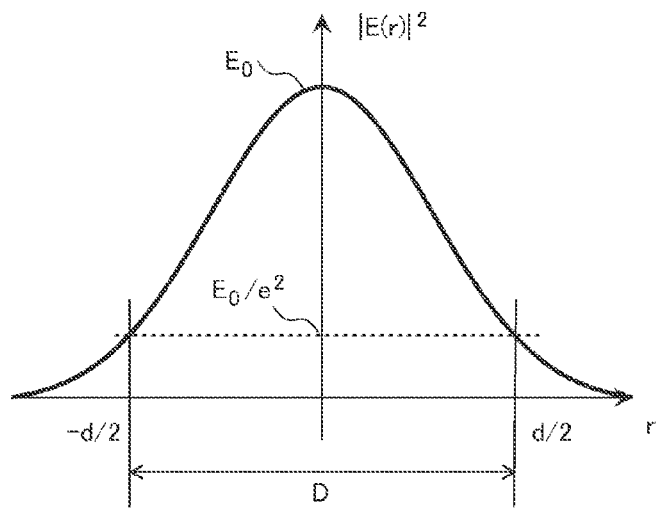
FIG. 6 is a diagram illustrating an example of a light intensity distribution of a Gaussian type laser light source.

FIG. 6 is a diagram illustrating an example of a light intensity distribution of a Gaussian type laser light source. A vertical axis represents the light intensity, and a horizontal axis represents the distance from the beam center. Furthermore, exiting properties are axial symmetry, an intensity distribution in the x direction and an intensity distribution in the y direction with respect to one pixel on the screen are approximately identical to each other. A light intensity E(r) is approximated by a Gaussian distribution expression, is reduced according to a distance r from the beam center, and is represented by the following expression.

$$|E(r)|^2 - E_0 * \exp[-2 * r^2 / (d/2)^2]$$

Here, $E_0$ is the intensity on the beam center, and d is the diameter of a Gaussian type beam. In r=d/2, the light intensity is attenuated to $1/e^2$, and the diameter d can be assumed as the beam diameter D used in this example.

Next, an effect obtained by setting the adjacent beam spots to include the overlap portion will be described. As illustrated in FIG. 5, each of the beams 22a, 22b, and 22c includes the overlap portions 24a and 24b. Accordingly, the pixel in the screen 12, for example, not only is a pixel 21b drawn by the central beam 22b irradiated with the beam 22b for drawing the pixel 21b, but also the pixel 21b is partially irradiated with the beams 22a and 22c for drawing the adjacent upper and lower pixels. However, a deviation in an irradiation timing according to a scanning time in the x direction occurs with respect to the adjacent beams 22a and 22c. Thus, each of the pixels 21 in the screen 12 is irradiated with the beam a plurality of times (three times) during one frame period.

Figure 7:
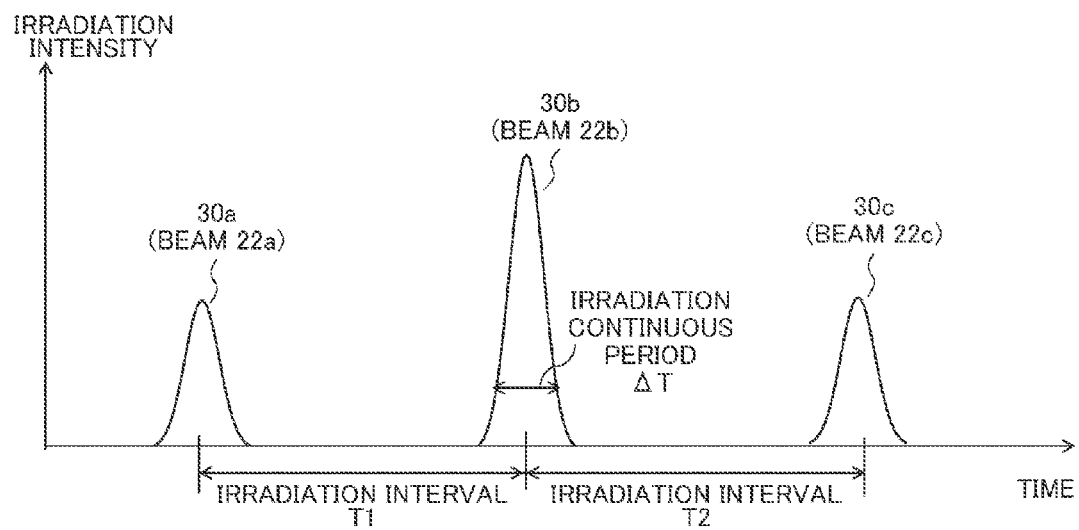
FIG. 7 is a diagram illustrating an irradiation pulse of laser light received in a pixel in the screen.

FIG. 7 is a diagram illustrating an irradiation pulse of the laser light received by the pixel in the screen. A horizontal axis represents time, and a vertical axis represents an irradiation intensity. For example, the pixel 21b illustrated in FIG. 5 receives irradiation pulses 31a, 31b, and 31c of three times. The central irradiation pulse 31b is due to the beam 22b, and the irradiation pulse 31a prior to the central irradiation pulse 31b and the irradiation pulse 31c following the central irradiation pulse 31b are respectively due to the adjacent beams 22a and 22c.

In a case of comparing the irradiation intensities thereof to each other, the irradiation center positions of the beams 22a and 22c of the irradiation pulse 31a prior to the central irradiation pulse 31b and the irradiation pulse 31c following the central irradiation pulse 31b are in the adjacent pixels, and thus, the irradiation intensity of the focused pixel 21b is less than the central irradiation pulse 31b. Naturally, an intensity ratio depends on the size of the overlap portions 24a and 24b of each of the beams 22a, 22b, and 22c.

Irradiation intervals T1 and T2 of each of the irradiation pulses are determined at time required for scanning the laser light in the x direction (the horizontal direction), and are different according to the position of the focused pixel 21b in the x direction position. The irradiation interval (the average irradiation interval) T in the central position in the x direction is 1/(f×V) which is one horizontal scanning period (f: Frame Rate, and V: Number of Pixels in y Direction). In addition, an irradiation continuous period ΔT each of the irradiation pulse 31a to 31c is approximately 1/(f×H×V) (H: Number of Pixels in x Direction). Furthermore, in a case where there is an invalid period where the image is not drawn during one frame period, the irradiation continuous period ΔT is shorter than the invalid period.

In the description of the irradiation pulse described above, a case has been assumed in which the focused pixel 21b is positioned in the central portion of the screen. In a pixel positioned on an upper end or a lower end of the screen (a scanning region), there is a pixel adjacent to one side of the focused pixel (a lower side or an upper side), and thus, the focused pixel is irradiated with a beam for drawing the adjacent pixel, and as a result thereof, the focused pixel is irradiated a plurality of times (two times) during one frame period.

Next, vibration conditions of the diffusion member for reducing the speckle will be described. Here, a case will be described in which one diffusion member 12b is vibrated by the vibration mechanism 13. In order to reduce the speckle, in FIG. 5 and FIG. 7, when the focused pixel 21b on the screen 12 is irradiated with the beam 22b (the irradiation pulse 31b), the speckle pattern (a first pattern) viewed by the user, and when the focused pixel 21b is irradiated with the beam 22a (the irradiation pulse 31a) and the beam 22c (the irradiation pulse 31c) which are adjacent to the beam 22b, the speckle pattern (a second pattern) viewed by the user vibrates (moves) the diffusion member 12b, and thus, may be changed to a different speckle pattern. In a case where a minimum movement distance of the diffusion member for the user to view the different speckle pattern is set to S, and a time interval for viewing the speckle pattern in the focused pixel 21b is set to T, the movement speed of the diffusion member may be greater than or equal to S/T.

First, the minimum movement distance S of the diffusion member will be described, and for this reason, a similarity R of the pattern is evaluated. In general, the similarity R is represented by Expression 1.

$$R = \frac{\sum_{i,j}(d_1[i,j]-\langle d_1 \rangle)(d_2[i,j]-\langle d_2 \rangle)}{\sqrt{\sum_{i,j}(d_1[i,j]-\langle d_1 \rangle)^2 \sum_{i,j}(d_2[i,j]-\langle d_2 \rangle)^2}}$$ [Expression 1]

Here, $d_1[i,j]$ and $d_2[i,j]$ are respectively arrangements representing the intensity distributions of the first speckle pattern and the second speckle pattern, and the average values thereof are respectively $\langle d_1 \rangle$ and $\langle d_2 \rangle$. In a case where two speckle pattern are coincident with each other, similarity R=1 is obtained, and in a case where two speckle patterns are perfectly independent from each other (decorrelated from each other), R=0 is obtained. According to a visual test, in a case where the similarity R is less than or equal to 0.2, it is considered that the speckle patterns are independent from each other as the correlation decreases.

An intensity distribution at the time of fixing the diffusion members 12a and 12b is applied as the first pattern $d_1[i,j]$, and an intensity distribution at the time of fixing the diffusion member 12a and of moving the diffusion member 12b by a distance x is applied as the second pattern $d_2[i,j]$. Then, a relationship between the movement distance x and the similarity R is obtained from Expression 1.

Figure 8:
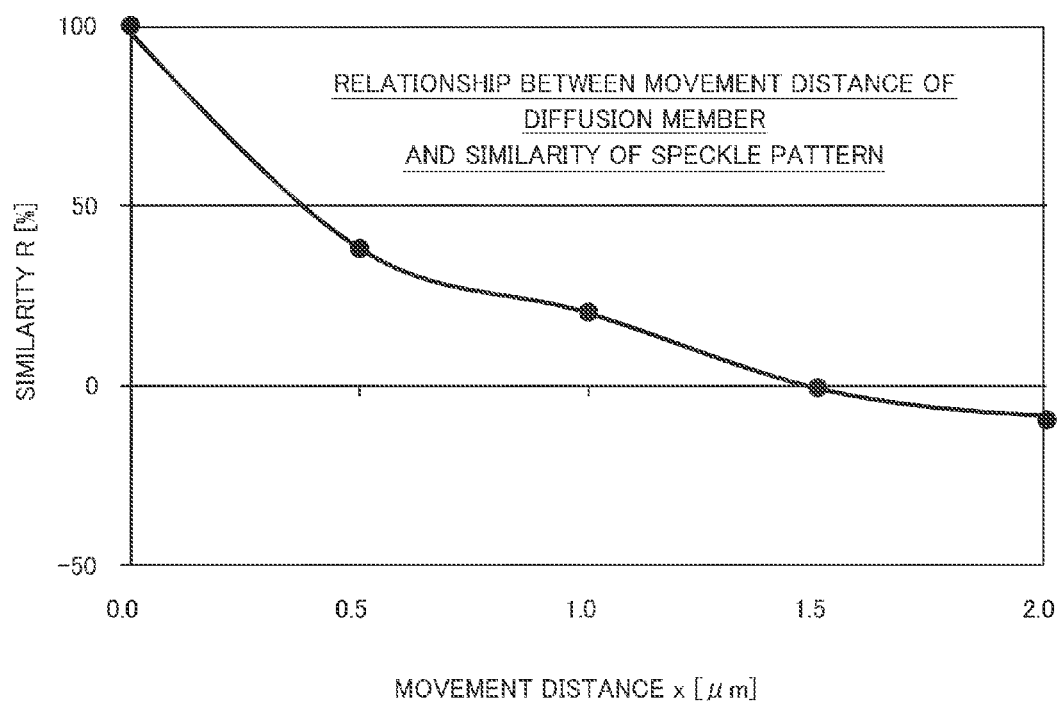
FIG. 8 is a diagram illustrating a relationship between a movement distance of a diffusion member and a similarity of a speckle pattern.

FIG. 8 is a diagram illustrating the relationship between the movement distance x of the diffusion member and the similarity R of the speckle pattern. In a simulation, a diffusion sheet having a diffusion angle of 30 degrees is used as the diffusion members 12a and 12b, and the intensity distributions (arrangements) $d_1$ and $d_2$ are obtained in an observation position of the user. Then, the similarity R [%] of the speckle pattern at each movement distance of the diffusion member 12b is calculated five times, and the average value thereof is obtained. As a result thereof, the diffusion member 12b is moved by x=1 μm (=0.001 mm), and thus, it is known that the similarity R of two speckle patterns decreases to approximately 20%, and both of the patterns are approximately independent from each other. Accordingly, the minimum movement distance of the diffusion member is determined as S=0.001 mm.

On the other hands, the time interval T where the speckle pattern is viewed is the irradiation intervals T1 and T2 of the irradiation pulses 31a, 31b, and 31c in FIG. 7, and the average value thereof is 1/(f×V). In a case of f=60/s and V=768, T=1/46080 is approximately 0.02 msec.

Accordingly, the lower limit value of the movement speed of the diffusion member 12b in this example is obtained by the following expression.

$$S/T=0.001 \times f \times V[mm/s]=0.001/0.02=50 \text{ mm/s}$$

The speed is a sufficient slow speed, and is practical. The diffusion member 12b is vibrated at such a speed, and thus, the speckle patterns obtained by irradiating one pixel on the screen 12 with an irradiation pulse a plurality of times during one frame period can be patterns which are not correlated with each other.

The interval where two speckle patterns are viewed (approximately 0.02 msec) is sufficient shorter than the time resolution of the eyes of the user, and thus, it is not possible for the user to identify each of the speckle patterns, and the plurality of speckle patterns are viewed in a state of being integrated. The correlation of the speckle pattern is small, and thus, the speckle pattern is averaged, and as a result thereof, the speckle viewed by the user is considerably reduced.

The speckle reducing effect increases as the beam diameter increases in a state where the diffusion member is vibrated. This is because an integration effect of the speckle pattern increases as the overlap portion 24 of the adjacent beams increases. According to a test result of the present inventors, the beam diameter D is set to be greater than or equal to 1.3 times the scanning interval Yp, and the diffusion member 12b is vibrated at the speed of 50 mm/s described above, and thus, it is possible to reduce the speckle to be less than or equal to ⅓, compared to a case where the screen is not vibrated.

In this example, the screen 12 is configured of two diffusion members, but in a case where the screen 12 is configured of only one diffusion member, the movement speed of the diffusion member necessary for reducing the speckle considerably increases. This is because it is necessary to increase a movement amount in order to move the same speckle patterns and to decrease the similarity (the correlation) thereof. For example, in a case where the frame rate f is 60, the number of pixels V in the vertical direction is 768, and the screen is one diffusion sheet having a diffusion angle of 30 degrees, it is necessary to vibrate the diffusion sheet at a speed of slower than or equal to 2 m/s according to the simulation. In this example, the screen 12 is configured of two diffusion members, and thus, it is possible to decrease the movement speed of the diffusion member necessary for reducing the speckle to a practical speed.

In this example, not only do the plurality of speckle patterns overlap each other during one frame period, but also the speckle patterns overlap each other between the adjacent frames, and thus, the speckle reducing effect increases. For this reason, the degree of the time resolution of the eyes of the user is set to prevent the same speckle pattern from being generated with respect to different frames during a short period. Specifically, a vibration frequency of the vibration mechanism may be selected not to be synchronized with the frame rate f, for example, not to be f×m or f/m (m is an integer) with respect to the frame rate f.

Hereinafter, a modification example of this example will be described. FIG. 5 illustrates that the respective trajectories 20a, 20b, and 20c of the laser light rays of the scanning element 11 are parallel to each other at regular intervals. However, the scanning pattern is not limited thereto.

Figure 9:
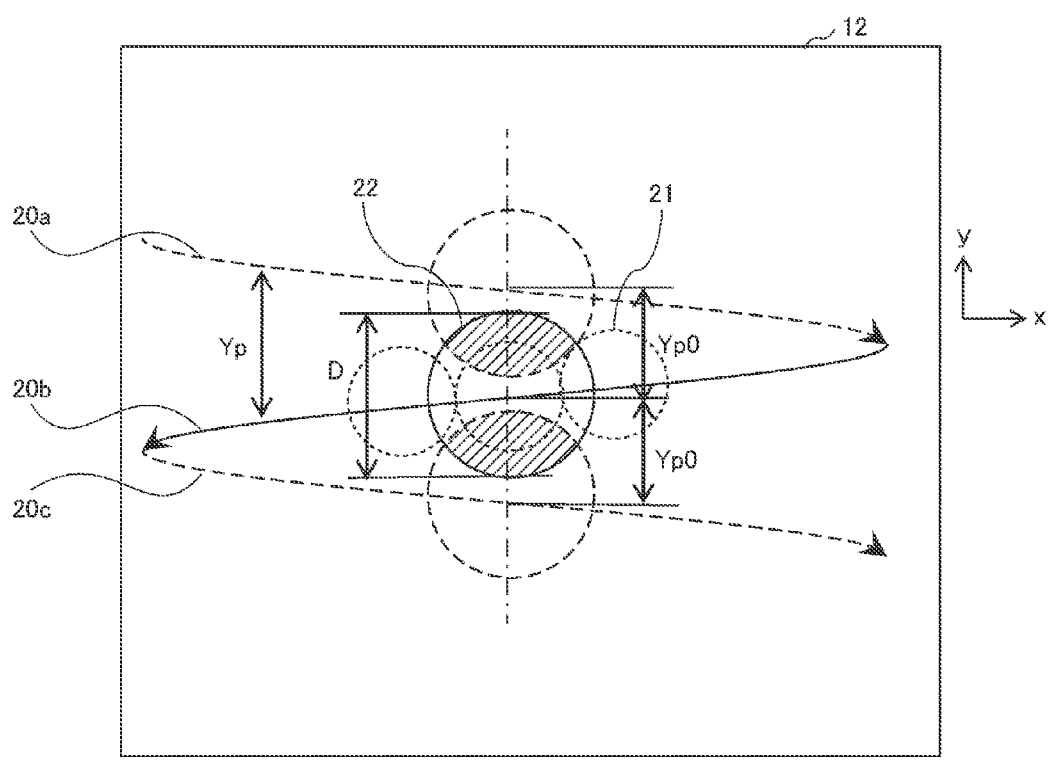
FIG. 9 is a diagram illustrating a case where trajectories of laser light rays are not parallel to each other.

FIG. 9 is a diagram illustrating a case where the respective trajectories 20a, 20b, and 20c of the laser light rays are non-parallel to each other. Here, a case will be described in which each of the trajectories in the shape of a sine wave. In this case, the scanning interval Yp in the y direction on each of the trajectories is changed according to the position in the x direction position in the screen 12. Accordingly, a magnitude relationship between the beam diameter D of the beam 22 and the scanning interval Yp is also changed according to the position in the x direction. In this case, when the beam diameter D is compared to an average scanning interval Yp0 on the central in the x direction in the screen, the beam diameter D is greater than the average scanning interval Yp0, and is preferably greater than or equal to 1.3 times the average scanning interval Yp0. According to this, the scanning interval Yp is deviated from Yp0 on an end portion of the screen in the x direction, and a constant beam overlap portion is included as the average value in the upper and lower directions between the adjacent beams in the upper and lower directions, and thus, similarly, the speckle reducing effect can be obtained.

In the example described above, the vibration direction of the diffusion member is set to the plane parallel to the diffusion surface of the diffusion member (the plane of xy), and thus, it is possible to obtain a great speckle reducing effect. In contrast, in a case where the diffusion member is vibrated in a direction perpendicular to the diffusion surface, it is necessary to set a movement speed to be approximately greater than or equal to three times that of the vibration in the parallel plane, and a resolution change of the image due to the vibration of the diffusion member is generated.

In this example, a speckle reducing method using a multiplicity of polarized light can be used together. That is, in the image display device 1 not including an optical member reflecting or transmitting only specific polarized light, an optical member multiplexing the polarized light is provided, and thus, it is possible to obtain a speckle reducing effect using the multiplicity of the polarized light in addition to the speckle reducing effect according to the vibration of the screen.

As described above, according to this example, a plurality of speckle patterns are integrated on the retinas of the user, and thus, it is possible to provide the image display device in which the speckle is reduced to be less than or equal to ⅓, compared to a case where the screen is not vibrated. At this time, the beam diameter of the laser light is set to be greater than the scanning interval, and at least one diffusion member of two diffusion members is vibrated, and thus, it is possible to decrease the movement speed of the diffusion member for obtaining the speckle reducing effect to a practical speed. In addition, the diffusion member having a general diffusion angle (for example, 30 degrees) is used, and thus, the luminance of the image does not decrease.

Example 2

In Example 2, the laser light applied to the screen 12 is set to elliptical laser light which is vertically long with respect to the screen. Accordingly, it is possible to obtain the speckle reducing effect without decreasing a resolution in the horizontal direction (the x direction).

In this example, for example, an optical element forming different beam diameters in the vertical direction and the horizontal direction, such as a cylindrical lens, is used as the beam forming machine 42 of the laser light source unit 10 illustrated in FIG. 2 of Example 1. Alternatively, the laser light sources 40a to 40c themselves may allow an elliptical beam to exit. Accordingly, the laser light applied to the screen 12 is in the shape of a beam which is vertically long with respect to the screen.

Figure 10:
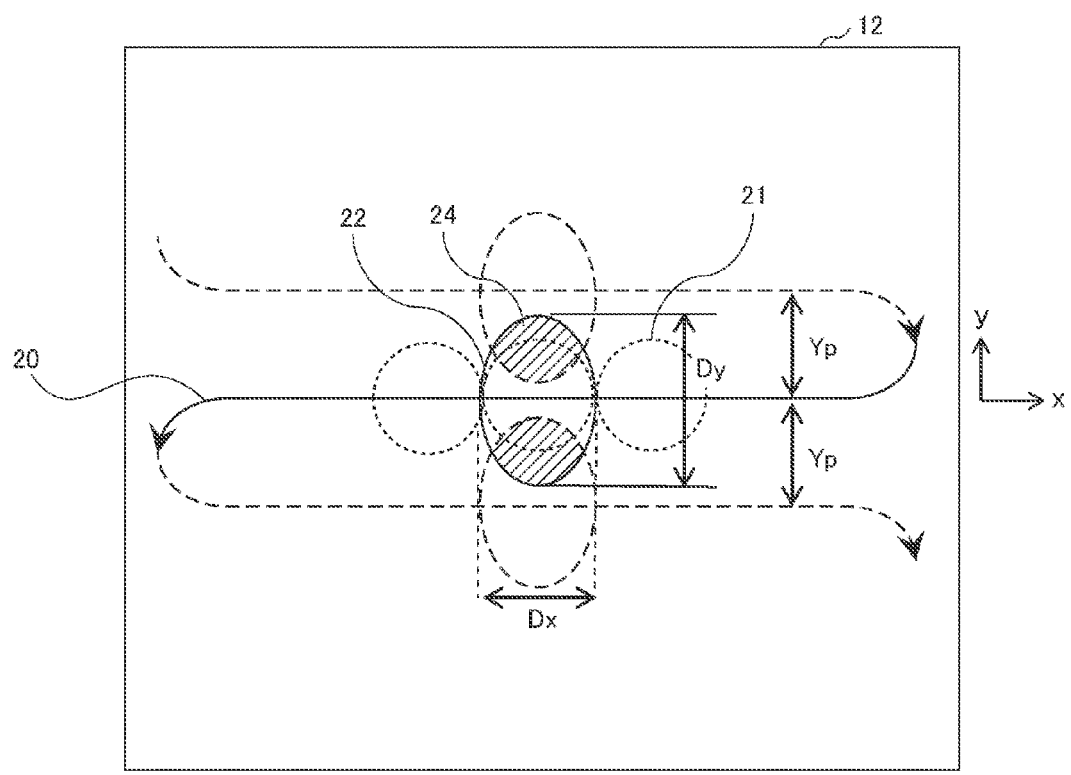
FIG. 10 is a diagram illustrating a trajectory of laser light to be scanned on a screen in Example 2.

FIG. 10 is a diagram illustrating a trajectory of laser light to be scanned on the screen in Example 2. A scanning pattern is identical to that illustrated in FIG. 5 of Example 1, linear portions of each of the trajectories 20 are parallel to each other at regular intervals. In a beam spot (the beam) applied to the screen 12, a diameter in the vertical direction (the y direction) is set to Dy, and a diameter in the horizontal direction (the x direction) is set to Dx, and thus, for example, a vertically long shape is obtained in which Dy is greater than or equal to 1.3 times Dx. At this time, a beam diameter Dx in the horizontal direction is approximately identical to the size of the pixel 21 to be drawn on the screen, and only the beam diameter Dy in the vertical direction is set to be large. As a result thereof, the beam diameter Dy in the vertical direction is greater than or equal to 1.3 times the scanning interval Yp, the overlap portion 24 is generated between the adjacent upper and lower beams, and as with Example 1, the speckle reducing effect can be obtained by the integration of the speckle patterns. On the other hands, the beam diameter Dx in the horizontal direction is identical to the size of the pixel 21, and thus, an overlap portion is not generated between the beam and the adjacent pixel in the horizontal direction. As a result thereof, it is possible to obtain the speckle reduce without decreasing the resolution in the horizontal direction.

Example 3

In Example 3, the scanning interval is set to be less than the beam diameter without changing the beam diameter of the laser light applied to the screen 12. For this reason, scanning line conversion of increasing the number of scanning lines of the image to be displayed (the number of pixels in the vertical direction) is performed. In this case, the beam diameter is greater than the scanning interval in the vertical direction, and thus, it is possible to obtain the speckle reducing effect.

FIG. 11 is a diagram illustrating a trajectory of laser light to be scanned on the screen 12 in Example 3. A scanning pattern is identical to that illustrated in FIG. 5 of Example 1, as a result of scanning line conversion processing, scanning intervals Yp' of each of the trajectories 20 in the y direction become narrow. Accordingly, the pixel 21 to be drawn on the screen 12 has a horizontally long shape, and the scanning interval Yp' is smaller than the size of the pixel 21 in the x direction. The beam 22 applied to the screen is set to a circle having the beam diameter D, and is approximately identical to the size of the pixel 21 to be drawn on the screen in the x direction. As a result thereof, the beam diameter D is greater than the scanning interval Yp', and the overlap portion 24 is generated between the adjacent beams in the y direction. In this case, it is preferable that the beam diameter D is greater than or equal to 1.3 times the scanning interval Yp'. Accordingly, it is possible to obtain the speckle reducing effect.

In this example, the number of scanning lines of the image to be displayed (the number of pixels in the y direction) increases, but the number of pixels in the x direction is not changed. Accordingly, the pixel on the screen has a horizontally long shape, and such an image can be obtained, and thus, the scanning line conversion processing is performed in the image processing unit 102 of FIG. 12.

FIG. 12 is a diagram schematically illustrating the scanning line conversion processing. (a) of FIG. 12 is an image to be input, (b) of FIG. 12 is an intermediate image after being expanded, (c) of FIG. 12 is an image to be output, and conversion is performed in two stages.

(a) of FIG. 12 is an image 61 to be input, the number of pixels in the vertical direction (the y direction) is set to $V_1$, and the number of pixels in the horizontal direction (the x direction) is set to H. A reference numeral of 64 represents a pixel array in the vertical direction, and each pixel is in the shape of a square in which vertical and horizontal sizes are identical to each other (for the sake of simplicity, a pixel region is illustrated as a rectangle). The number of scanning lines of the image 61 is $V_1$, and a scanning interval (a pixel interval) is Yp.

(b) of FIG. 12 illustrates an intermediate image 62 in which the image 61 is expanded in the vertical direction by only e times. In such processing, the pixel size is not changed, and thus, the number of pixels in the vertical direction (the number of scanning lines) increases to $V_2$ ($V_1 < V_2$), in the intermediate image 62. Herein, the magnification is $e = V_2/V_1$, and the pixel array 65 represents a pixel array in the vertical direction after being expanded.

(c) of FIG. 12 illustrates an image 63 in which the intermediate image 62 is contracted in the vertical direction by 1/e times, and is returned to the original size of the image 61. At this time, the number of pixels V2 in the vertical direction (the number of scanning lines) is maintained, and thus, the scanning interval (the pixel interval) narrows to Yp'. Accordingly, the scanning interval is contracted to Yp'/Yp=1/e. A pixel array 66 represents a pixel array in the vertical direction after being contracted, and each pixel has a horizontally long shape. Thus, the image 63 in which the number of scanning lines increases by e times (the scanning interval is reduced to 1/e) is output and is displayed on the image display unit 100.

A magnification e of the image is set to be matched to a proportion between the beam diameter and the scanning interval in FIG. 11. That is, in order to set the beam diameter D to be greater than or equal to 1.3 times the scanning interval Yp', the magnification e may be greater than or equal to 1.3 times. Furthermore, the vertical and horizontal sizes of the image 63 to be output by such conversion are identical to the size of the image 61 to be input, and thus, do not affect the size of the image to be displayed on the screen.

According to this example, the scanning interval Yp' narrows, and thus, the overlap portion 24 is generated between the adjacent upper and lower beams, and as with Example 1, the speckle reducing effect can be obtained by the integration of the speckle patterns. On the other hands, the beam diameter D is set to be identical to the horizontal size of the pixel 21, and thus, the overlap portion between the beam and the adjacent pixel in the horizontal direction is not generated. As a result thereof, it is possible to obtain the speckle reducing effect without decreasing the resolution in the horizontal direction.

Example 4

In Example 4, a plurality of operation modes of selecting the speckle reducing effect will be described. As described in Example 1, the speckle reducing effect depends on an overlap amount between the adjacent beams and the movement speed of the diffusion member. However, in a case of increasing the overlap amount between the adjacent beams in order to increase the effect, the resolution of the image decreases, and in a case of increasing the movement speed of the diffusion member, the power consumption increases. Accordingly, an operation mode is selected according to the priority of the user, according to the usage conditions of the image display device.

Figure 13:
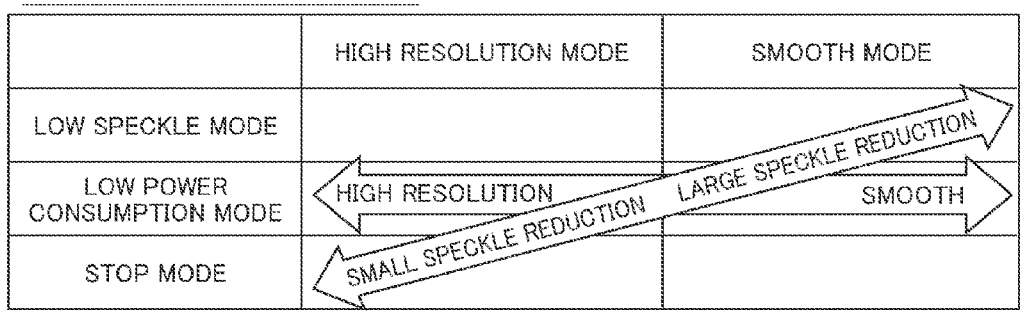
FIG. 13 is a diagram illustrating an example of a plurality of operation modes of selecting a speckle reducing effect.

FIG. 13 is a diagram illustrating an example of the plurality of operation modes of selecting the speckle reducing effect.

A "low speckle mode", a "low power consumption mode", and a "stop mode", in which the vibration amount (the movement speed) of the diffusion member is switched, and a "high resolution mode" and a "smooth mode", in which the size of the beam diameter of the laser light or the size of a gap between two diffusion members is switched, can be selected as the operation mode.

The "low speckle mode" is an operation state in which a high movement speed is selected from two or more types of movement speeds, and the speckle reducing effect is greatly exhibited.

The "low power consumption mode" is an operation state in which from a slow movement speed is selected two or more types of movement speeds, and the speckle reducing effect can be obtained in consideration of low power consumption.

The "stop mode" is a state in which the vibration mechanism 13 is stopped, and the diffusion member is not vibrated. Naturally, in such a mode, the speckle reducing effect is not obtained, and thus, it is desirable that the mode proceeds to the "high resolution mode".

The abnormality vibration detection unit 106 of the image display device 1 determines whether or not the diffusion member 12b is normally vibrated. In a case where it is detected that the diffusion member 12b is not normally vibrated, the abnormality vibration detection unit 106 instructs the vibration mechanism 13 to be operated in the "stop mode".

In the "high resolution mode", an interval between two diffusion members 12a and 12b narrows. Alternatively, a proportion between the beam diameter D and the scanning interval (the pixel size) is changed to a small value. Accordingly, the speckle reducing effect decreases, but a high resolution image can be displayed.

In the "smooth mode", the interval between two diffusion members 12a and 12b widens. Alternatively, the proportion between the beam diameter D and the scanning interval (the pixel size) is changed to a large value. Accordingly, it is possible to increase the speckle reducing effect and to display a smooth image.

The user is capable of selecting the operation mode according to the usage conditions of the image display device, and thus, is capable of providing a device having excellent usability.

Figure 14:
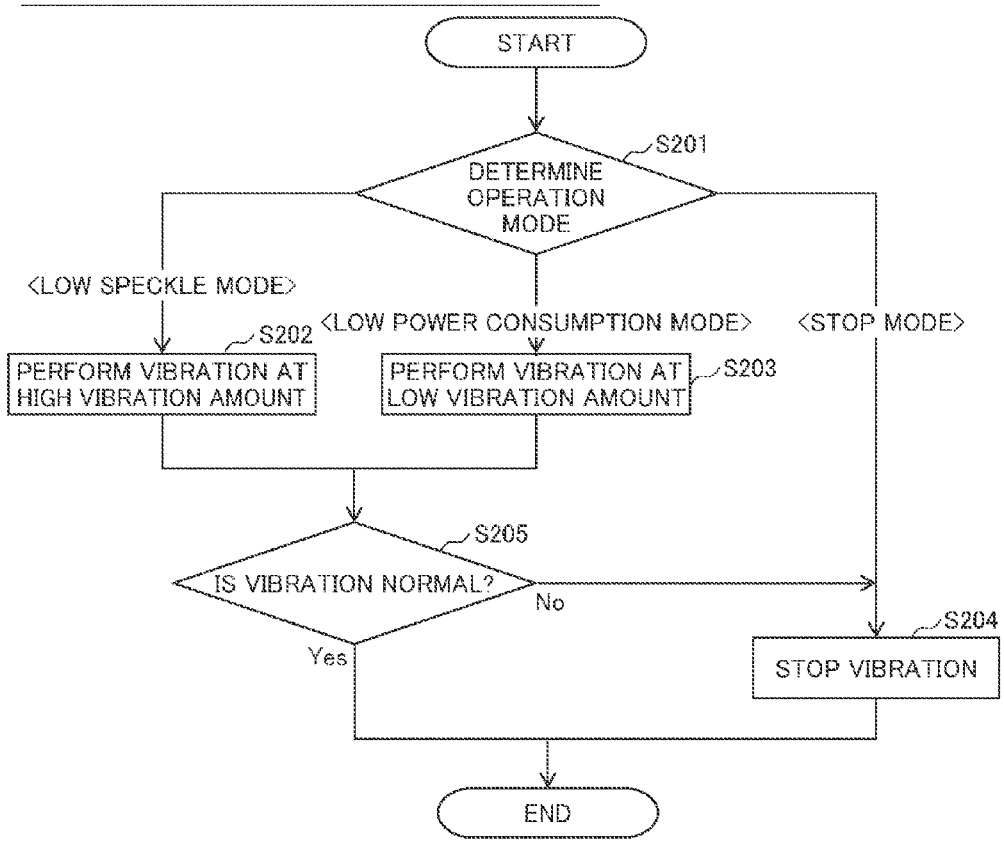
FIG. 14 is a flowchart illustrating operation setting of a vibration mechanism according to the selection of the operation mode.

FIG. 14 is a flowchart illustrating operation setting of the vibration mechanism 13 according to the selection of the operation mode. The vibration mechanism 13 determines a vibration state of the diffusion member 12b according to three operation modes of the "low speckle mode", the "low power consumption mode", and the "stop mode" described above.

This flowchart, for example, is started at the time of performing power activation with respect to the image display device 1 or inputting an instruction of a user 17. In S201, the selected operation mode is determined.

In a case where the "low speckle mode" is selected, the process proceeds to S202, and the vibration mechanism 13 vibrates the diffusion member at a high movement speed (a high vibration amount). In a case where the "low power consumption mode" is selected, the process proceeds to S203, and the vibration mechanism 13 vibrates the diffusion member at a slow movement speed (a low vibration amount). In a case where the "stop mode" is selected, the process proceeds to S204, and the vibration mechanism 13 stops the vibration of the diffusion member.

The process proceeds to S205 during a period where the vibration mechanism 13 is operated in the "low speckle mode" or the "low power consumption mode", and the abnormality detection unit 106 determines whether or not the diffusion member is normally vibrated. In a case where the diffusion member is normally vibrated, the vibration continues as it is, and in a case where an abnormality is detected, the process proceeds to S204, and the vibration of the diffusion member is stopped.

Accordingly, the vibration mechanism vibrates the diffusion member according to the operation mode and stops the vibration at the time of abnormal vibration, and thus, the safety of the device is improved.

As described above, various examples of the present invention have been described, and the image display device of the present invention can be applied to the following device and system.

Figure 15:
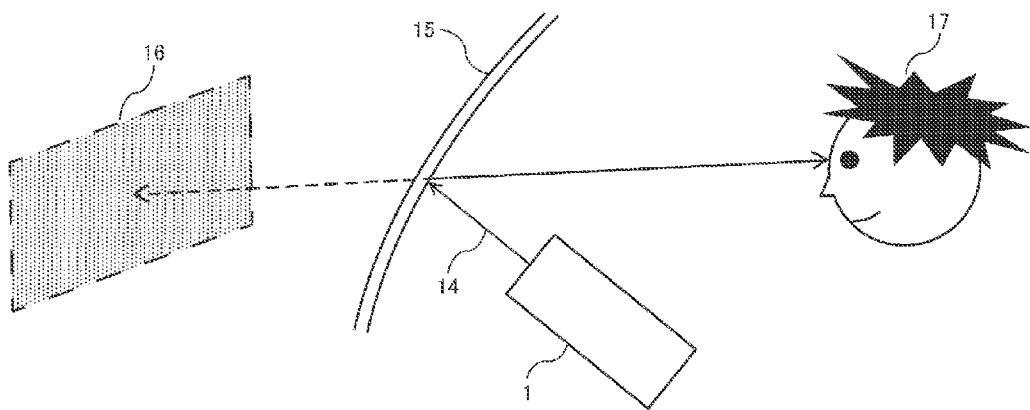
FIG. 15 is an example in which the image display device is applied to an on-vehicle head-up display.

FIG. 15 is a schematic view of a case where the image display device 1 of the present invention is applied to an on-vehicle head-up display (HUD). The image display device 1 is mounted on a vehicle dashboard, and the image light 14 exiting therefrom is reflected on a reflection surface 15 such as front glass and reaches the eyes of the user (a driver) 17. The user 17 recognizes the image light 14 generated on the screen 12 of the image display device 1 as a virtual image 16 in a front position of the reflection surface 15. Vehicle speed information or the like is included in an image to be display, and thus, it is possible to construct a driving support system.

At this time, the operation mode of the image display device 1 is controlled according to a driving state of a vehicle. For example, in a case where an automobile is stopped in order to wait for a traffic signal, the vibration mechanism is switched to the "stop mode", and thus, the safety is further improved.

Figure 16:
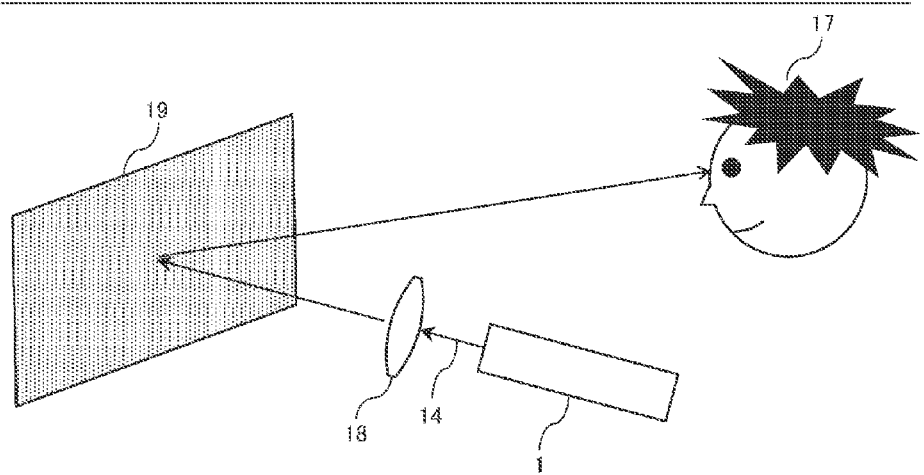
FIG. 16 is an example in which the image display device is applied to a projection type image display device.

In addition, FIG. 16 is a schematic view of a case where the image display device 1 of the present invention is applied to a projection type image display device (a projector). The image display device 1 is combined with a projection lens 18, and thus, an image is projected onto a projection surface 19. The projection lens 18 is configured such that the image light 14 generated on the screen 12 of the image display device 1 is formed on the projection surface 19. The image light 14 is transmitted through the projection lens 18, reaches the projection surface 19, and is scattered. The user 17 views the scattered light on the projection surface 19, and thus, recognizes the image.

Each of the examples described above is for describing the present invention to be easily understood, but does not limit the scope of the present invention. Accordingly, a person skilled in the art is capable of adopting an embodiment in which each component or all components are substituted with the equivalents thereof, and such an embodiment is included in the scope of the present invention.

REFERENCE SIGNS LIST

1: image display device,
10: laser light source unit,
11: scanning element,
12: screen,
12a, 12b: diffusion member,
13: vibration mechanism,
14: image light,
20, 20a to 20c: scanning trajectory,
21: pixel,
22, 22a to 22c: beam spot (beam),
24, 24a, 24b: beam overlap portion,
31a to 31c: irradiation pulse,
40a to 40c: laser light source,
41a, 41b: dichroic mirror,
42: beam forming machine,
51: elastic body,
52: eccentric motor,
61, 62, 63: image,
64, 65, 66: pixel array,
100: image display unit,
101: control unit,
102: image processing unit,
103: information storage unit,
104: communication processing unit,
105: communication input and output unit,
106: abnormality detection unit,
Yp: scanning interval,
D, Dx, Dy: beam diameter.

The invention claimed is:

1. An image display device displaying an image by scanning laser light, the device comprising:
a laser light source unit allowing the laser light to exit;
a screen formed of at least two diffusion members which diffuse and transmit the laser light and generate image light;
a vibration mechanism vibrating at least one diffusion member among the diffusion members; and
a scanning element scanning the laser light exiting from the laser light source unit in a first direction on the screen and a second direction orthogonal to the first direction,
wherein a scanning speed of the scanning element in the second direction is faster than a scanning speed in the first direction, and
wherein a diameter of the laser light in the first direction on the screen is greater than or equal to 1.3 times an interval in the first direction of a scanning trajectory in the second direction on the screen.

2. The image display device according to claim 1, wherein the diameter of the laser light in the first direction on the screen is greater than or equal to 1.3 times a diameter of the laser light in the second direction.

3. The image display device according to claim 1, wherein the interval in the first direction of the scanning trajectory in the second direction on the screen is less than a width of one pixel of an image to be generated on the screen in the second direction.

4. The image display device according to claim 3, further comprising:
an image processing unit increasing a number of scanning lines in the second direction with respect to an input image.

5. The image display device according to claim 1, wherein the vibration mechanism vibrates the at least one diffusion member in a plane parallel to a diffusion surface thereof.

6. The image display device according to claim 5, wherein the vibration mechanism vibrates the at least one diffusion member at a movement speed of greater than or equal to 0.001×f×V mm/s, where a frame rate of the image to be generated on the screen is set to f, and the number of pixels of the image in the first direction is set to V.

7. The image display device according to claim 5, wherein the motor is configured to vibrate the at least one diffusion member at a movement speed of greater than or equal to 0.001×f×V mm/s, where a frame rate of the image to be generated on the screen is set to f, and the number of pixels of the image in the first direction is set to V.

8. The image display device according to claim 1, wherein an interval between diffusion surfaces of the diffusion members configuring the screen is switched, wherein a movement speed of the at least one diffusion member according to the vibration mechanism is capable of being switched, and wherein a plurality of operation modes are capable of being selected according to a plurality of combinations of the interval between diffusion surfaces and the movement speed of the at least one diffusion member.

9. The image display device according to claim 1, wherein an interval between diffusion surfaces of the diffusion members configuring the screen is switched, wherein a movement speed of the at least one diffusion member according to the vibration by the motor is capable of being switched, and wherein a plurality of operation modes are capable of being selected according to a plurality of combinations of the interval between diffusion surfaces and the movement speed of the at least one diffusion member.

10. An image display device displaying an image by scanning laser light, the device comprising:
a laser light source configured to emit the laser light;
a screen including at least two diffusion members configured to diffuse and transmit the laser light and generate image light;
a motor configured to vibrate at least one diffusion member among the diffusion members; and
a scanning element including a mirror surface configured to scan the laser light emitted from the laser light source in a first direction and a second direction on the screen, the second direction being orthogonal to the first direction,
wherein a scanning speed of the scanning element in the second direction is faster than a scanning speed in the first direction,
wherein a diameter of the laser light in the first direction on the screen is greater than an interval in the first direction of a scanning trajectory in the second direction on the screen, and
wherein the motor vibrates the at least one diffusion member at a movement speed of greater than or equal to 0.001×f×V mm/s, where a frame rate of the image to be generated on the screen is set to f, and a number of pixels of the image in the first direction is set to V.

11. The image display device according to claim 10, wherein the diameter of the laser light in the first direction on the screen is greater than or equal to 1.3 times the interval in the first direction of the scanning trajectory in the second direction on the screen.

12. The image display device according to claim 10, wherein the diameter of the laser light in the first direction on the screen is greater than or equal to 1.3 times a diameter of the laser light in the second direction.

13. The image display device according to claim 10, wherein the interval in the first direction of the scanning trajectory in the second direction on the screen is less than a width of one pixel of an image to be generated on the screen in the second direction.

14. The image display device according to claim 13, further comprising:
an image processing unit increasing a number of scanning lines in the second direction with respect to an input image.

15. The image display device according to claim 10, wherein the motor vibrates the at least one diffusion member in a plane parallel to a diffusion surface thereof.

16. The image display device according to claim 10, wherein an interval between diffusion surfaces of the diffusion members configuring the screen is switched, wherein a movement speed of the diffusion member according to the motor is capable of being switched, and wherein a plurality of operation modes are capable of being selected according to a combination of the switching.

17. An image display device displaying an image by scanning laser light, the device comprising:
a laser light source configured to emit the laser light;
a screen including at least two diffusion members configured to diffuse and transmit the laser light and generate image light;
a motor configured to vibrate at least one diffusion member among the diffusion members; and
a scanning element including a mirror surface configured to scan the laser light emitted from the laser light source in a first direction and a second direction on the screen, the second direction being orthogonal to the first direction,
wherein a scanning speed of the scanning element in the second direction is faster than a scanning speed in the first direction, and
wherein a diameter of the laser light in the first direction on the screen is greater than or equal to 1.3 times an interval in the first direction of a scanning trajectory in the second direction on the screen.

18. The image display device according to claim 17, wherein the diameter of the laser light in the first direction on the screen is greater than or equal to 1.3 times a diameter of the laser light in the second direction.

19. The image display device according to claim 17, wherein the interval in the first direction of the scanning trajectory in the second direction on the screen is less than a width of one pixel of an image to be generated on the screen in the second direction.

20. The image display device according to claim 17, wherein the motor is configured to vibrate the at least one diffusion member in a plane parallel to a diffusion surface thereof.

* * * * *